(12) United States Patent
Choi et al.

(10) Patent No.: US 9,099,224 B2
(45) Date of Patent: Aug. 4, 2015

(54) APPARATUS AND METHOD FOR NANOCOMPOSITE SENSORS

(75) Inventors: Jin-Woo Choi, Baton Rouge, LA (US); Chao-Xuan Liu, Baton Rouge, LA (US)

(73) Assignee: BOARD OF SUPERVISORS OF LOUISIANA STATE UNIVERSITY AND AGRICULTURAL AND MECHANICAL COLLEGE, Baton Rouge, LA (US)

( * ) Notice: Subject to any disclaimer, the term of this patent is extended or adjusted under 35 U.S.C. 154(b) by 612 days.

(21) Appl. No.: 13/496,135

(22) PCT Filed: Sep. 30, 2010

(86) PCT No.: PCT/US2010/050858
§ 371 (c)(1),
(2), (4) Date: Apr. 27, 2012

(87) PCT Pub. No.: WO2011/041507
PCT Pub. Date: Apr. 7, 2011

(65) Prior Publication Data
US 2012/0266685 A1 Oct. 25, 2012

Related U.S. Application Data

(60) Provisional application No. 61/277,962, filed on Oct. 1, 2009.

(51) Int. Cl.
| | |
|---|---|
| B82Y 15/00 | (2011.01) |
| H01B 1/24 | (2006.01) |
| G01L 1/20 | (2006.01) |
| G01L 9/00 | (2006.01) |

(52) U.S. Cl.
CPC . *H01B 1/24* (2013.01); *B82Y 15/00* (2013.01); *G01L 1/20* (2013.01); *G01L 9/0042* (2013.01); *G01L 9/0054* (2013.01); *C08K 2201/00* (2013.01); *Y10T 428/24893* (2015.01)

(58) Field of Classification Search
None
See application file for complete search history.

(56) References Cited

U.S. PATENT DOCUMENTS

| | | |
|---|---|---|
| 6,136,909 A | 10/2000 | Liao et al. |
| 6,813,931 B2 | 11/2004 | Yadav et al. |
| 2004/0099438 A1* | 5/2004 | Arthur et al. ............... 174/257 |
| 2005/0152175 A1 | 7/2005 | Ashton et al. |
| 2006/0197826 A1 | 9/2006 | Assa et al. |
| 2007/0272901 A1 | 11/2007 | Gouma |
| 2009/0184281 A1 | 7/2009 | Yadav et al. |
| 2010/0052995 A1* | 3/2010 | Lee et al. ............ 343/700 MS |

OTHER PUBLICATIONS

Abstract for IN 2011/002314 (Jan. 2011).*
Notification of Transmittal of the International Search Report and the Written Opinion of the International Searching Authority, or the Declaration issued by the International Searching Authority in the corresponding international application.

* cited by examiner

*Primary Examiner* — Marc Zimmer
(74) *Attorney, Agent, or Firm* — Jason P. Mueller; Adams and Reese LLP

(57) ABSTRACT

A sensing material for use in a sensor is disclosed. Such a sensing material includes a polymer base and a piezoresistive nanocomposite embedded into the polymer base in a continuous pattern. The nanocomposite comprises a polymer matrix and a plurality of conductive nanofillers suspended in the matrix. The conductive nanofillers may be one or a combination of nanotubes, nanowires, particles and flakes. The density of the plurality of nanofillers is such that the nanocomposite exhibits conductivity suitable for electronic and sensor applications.

8 Claims, 7 Drawing Sheets

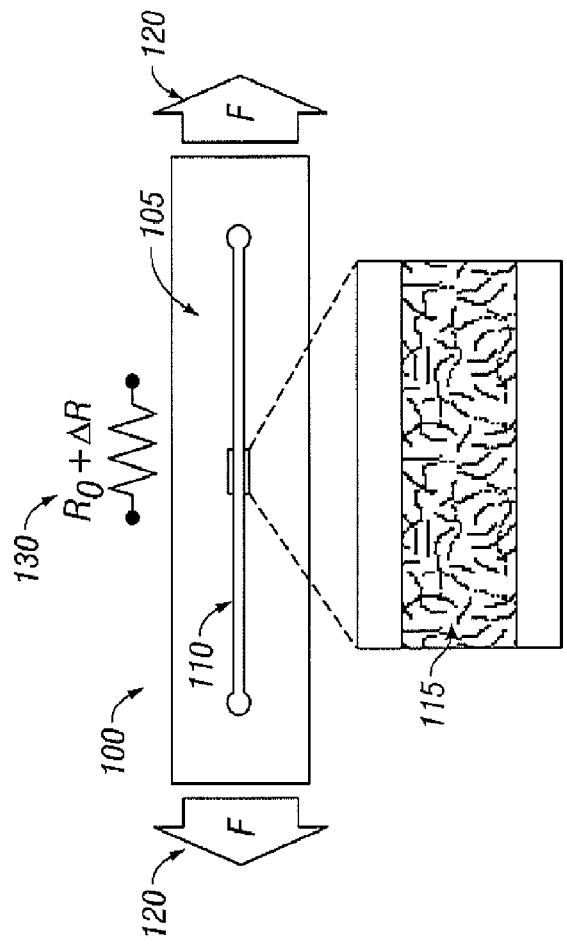
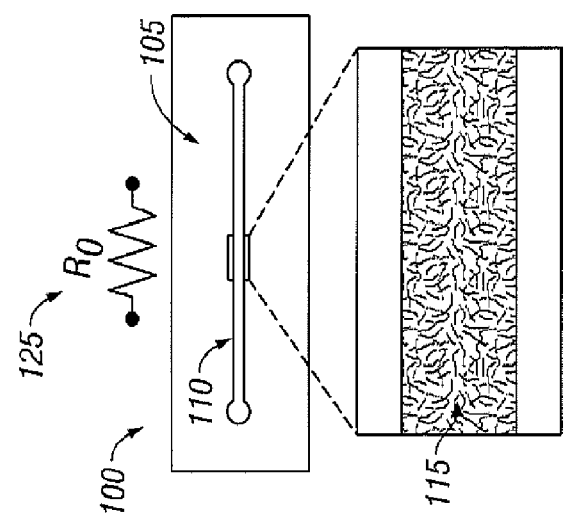
FIG. 1B
FIG. 1A

APPARATUS AND METHOD FOR NANOCOMPOSITE SENSORS

CROSS-REFERENCE TO RELATED APPLICATIONS

This application is the National Stage of International Application No. PCT/US2010/05858, filed Sep. 30, 2010, which claims the benefit of U.S. patent application Ser. No. 61/277,962, filed Oct. 1, 2009, which is hereby incorporated by reference in its entirety.

FIELD

The present invention generally regards sensors, and, more particularly, highly sensitive sensors utilizing conductive polymer nanocomposites.

BACKGROUND

In recent years, nanotubes and nanowires have been developed for applications in nanomechanical structures and electronic materials. Carbon nanotubes are of particular interest due to their electrical and mechanical properties. Similarly, silicon nanowires are currently being developed for electronic applications. While in theory a single nanotube or nanowire can be employed to construct an electronic device, such as a transistor, there are obstacles in realizing a single nanotube or nanowire based electronic device due to difficulties with their manufacturability. For instance, placement of a single nanotube/nanowire in a desired location may require manual alignment and assembly in that location. Further, individual nanotubes and/or nanowires often exhibit slightly different electrical characteristics. One possible method to overcome these obstacles in electronic and/or sensory applications is to employ a conductive material comprised not of a single nanotube/nanowire, but rather of a network of nanowires.

In the field of ultrasensitive pressure monitoring, for instance, the measurement of small pressure changes (e.g., pressure changes <100 Pa or <0.75 mmHg) with a simple and rapid electronic device is challenging, particularly where a small footprint for the sensing device is required. Membrane or diaphragm-based microscale pressure sensors on silicon have been successfully developed with microelectromechanical systems (MEMS) technology. In such devices, a thin silicon membrane deflects as a result of a pressure change across the membrane, with larger pressure changes resulting in correspondingly larger deflections of the membrane. However, since silicon is a relatively stiff material and the deflection will be negligible in instances of very small pressure differences applied across the membrane, it may not be suitable for measurement of very small pressure changes.

SUMMARY

In contrast to silicon, polymer and/or elastomer-based materials offer superior mechanical flexibility and elasticity and are capable of withstanding significant tensile strain and deformation without mechanical failure. While such materials are ordinarily not electrical conductors, a nanocomposite of a polymer and nanotubes/nanowires may be formed wherein the nanotubes/nanowires are distributed throughout the composite to form a conductive network. Such a nanocomposite offers the mechanical benefits of a polymer and a conductivity suitable for electronic and sensor applications.

According to an exemplary embodiment of the present invention, a sensing material for a sensor is provided that includes a polymer base into which a conductive nanocomposite is embedded in one or more continuous patterns. The nanocomposite includes a polymer matrix into which carbon nanotubes and/or carbon nanowires have been suspended such that the nanocomposite exhibits an electrical conductivity. Electrical contacts may be included at each of two ends of the patterned nanocomposite such that the resistance or change in resistance of the nanocomposite may be monitored and/or recorded as the sensing material is stretched, strained, deflected, or otherwise mechanically manipulated.

BRIEF DESCRIPTION OF THE DRAWINGS

FIGS. 1a and 1b are plan and exploded views of a sensing material according to an exemplary embodiment of the present invention.

DETAILED DESCRIPTION

Figure 2B:
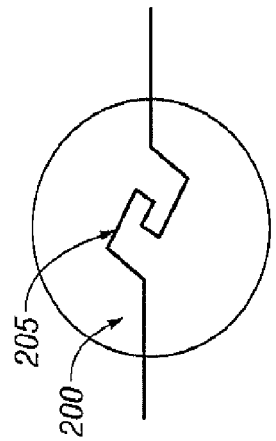
FIGS. 2a to 2h are plan views of sensing materials having differing embedded nanocomposite patterns according to exemplary embodiments of the present invention.
Figure 2D:
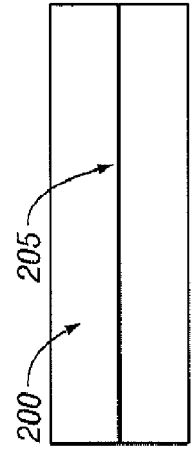
Figure 2E:
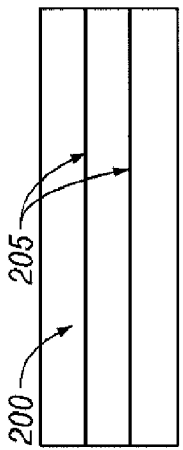
Figure 2A:
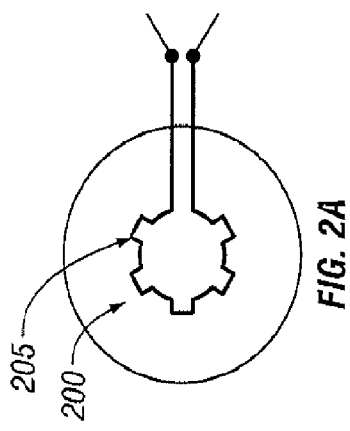
Figure 2C:
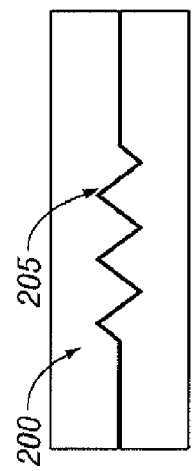
Figure 2G:
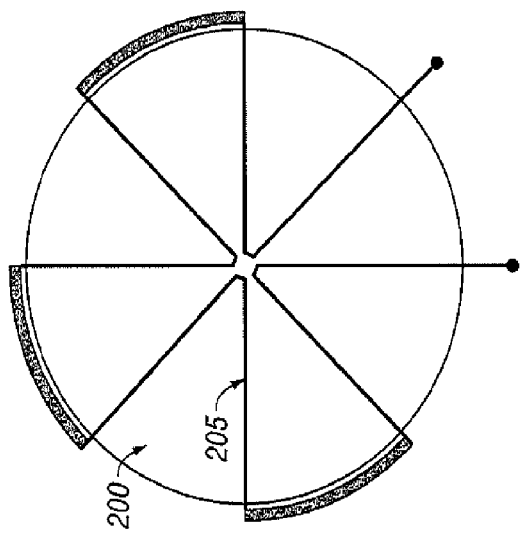
Figure 2F:
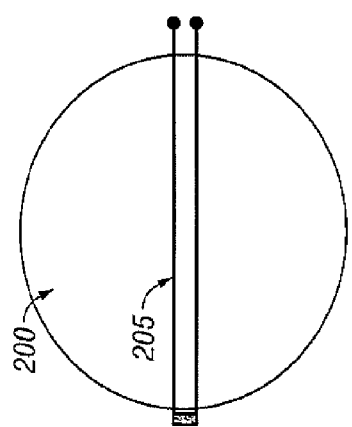
Figure 2H:
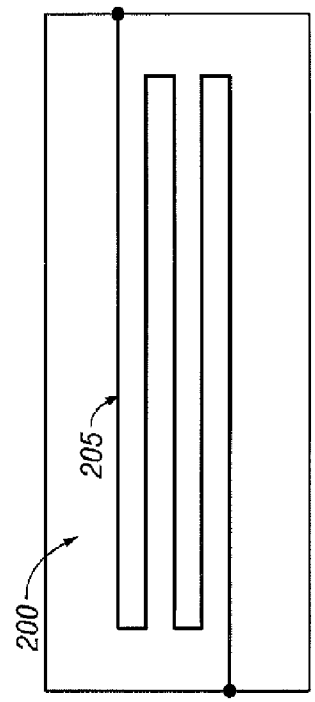

Embodiments of the present invention combine the mechanical benefits of polymer materials with the conductive characteristics of nanotubes and/or nanowires to provide advantages over current sensors and systems. A composite of polymer and conductive nanotubes/nanowires allows for a sensing material that is flexible, biocompatible, chemically inert, low cost, and highly sensitive.

According to an exemplary embodiment of the present invention, a sensing material may comprise a polymer base into which a conductive nanocomposite is embedded in a particular pattern. The nanocomposite may comprise a polymer matrix into which a nanoscaled filler ("nanofiller") is suspended such that the nanocomposite is conductive. For a polymer to be conductive, the conductive nanofillers dispersed therein either physically touch to form an electron-conducting path or are sufficiently close to each other to allow electron transfer via a "tunneling effect." In certain embodiments of the present invention, a conductive nanocomposite or method for fabricating such may be configured to adjust the conductivity of the composite by varying the density and/or distribution of the nanofiller suspended in the polymer matrix.

The conductive nanofillers employed in embodiments of the present invention may be of any geometric configuration, including nanotubes, nanowires, particles and flakes. However, the particular geometric configurations of nanotubes and/or nanowires may be more susceptible to distortion and thus may be more desirable for sensing materials configured to detect or otherwise respond to distortions thereupon. Embodiments of the present invention may include a nanocomposite having a plurality of a particular nanofiller (e.g., nanotubes) or a mixture of different types of nanofillers (e.g., nanotubes and nanowires). Further, the nanofillers may be comprised of any conductive material including, but not limited to, carbon, silicon, copper, gold and other metals, etc. In exemplary embodiments of the present invention, the nanofillers employed may be carbon nanotubes (CNTs) or carbon nanowires. In embodiments employing CNTs, multi-walled carbon nanotubes (MWCNTs) may be used. In certain embodiments, the density of the nanotubes and/or nanowires suspended in the polymer is such that the nanocomposite exhibits a bulk conductivity of about 0 to about 500 S/m.

In certain embodiments of the present invention, the polymer selected for the polymer base of the sensing material and/or the polymer matrix of the nanocomposite is an elastomeric polymer. In other embodiments, the polymer base and/or polymer matrix may be selected from at least one of polydimethylsiloxane (PDMS), silicone elastomer, vinyl acetate, ethylene propylene rubber, polyimide, polytetrafluroethylene (PTFE), poly(p-xylyene) polymer, fluorocarbon-based polymer, and poly(methyl methacrylate) (PMMA). In a preferred embodiment, PDMS is used as the polymer matrix in order to take advantage of the mechanical elasticity of PDMS, which may hold over 100% of tensile strain without mechanical failure. Embodiments of the present invention wherein PDMS is selected as the base polymer and/or the polymer matrix for the nanocomposite may be configured to repeatedly withstand large deformations without compromising structural integrity and may thus be downsized in scale when necessary. Embodiments employing PDMS may be further configured to be chemically inert and biocompatible.

According to an exemplary embodiment of the present invention, a nanofiller, which may be CNTs, MWCNTs, and/or nanowires, may be distributed in a polymer matrix at a density at or beyond the percolation threshold of the selected nanofiller such that the resulting nanocomposite exhibits conductivity. According to certain embodiments, the nanocomposite may be configured such that its bulk conductivity ranges from about 0 to about 500 S/m. In certain embodiments, the nanofiller may be uniformly distributed throughout the polymer matrix. When the nanocomposite is exposed to tensile or compressive strain, the geometry and interconnections of the nanofiller within the polymer matrix vary accordingly, which leads to a change in its electrical resistance (i.e., a piezoresistive effect).

According to exemplary embodiments of the present invention, a nanocomposite may be embedded into a polymer base as a continuous pattern. Said continuous pattern may take the form of a line, a curve, or combination thereof. Further embodiments may incorporate multiple nanocomposite patterns embedded in the polymer base. A patterned nanocomposite embedded in a polymer base may have a first end and a second end. Further embodiments may incorporate one or more electrical terminals that physically contact each end of an embedded nanocomposite pattern and are configured to allow for the measurement of the voltage, current, and/or resistance of the nanocomposite. Accordingly, certain embodiments of the present invention may incorporate a device for taking such measurements, such as a voltmeter, an ohmmeter, or a multimeter. A device for storing such measurements over time, such as a computer, microprocessor or any appropriate electronic storage media may also be included. Further, certain embodiments may include a device for recording and converting voltage, current or resistance measurements into corresponding pressure, strain or location/displacement measurements, such as a computer, microprocessor, programmable logic controller or other such device capable of performing such storage and/or computations.

Embodiments of the present invention may include any sensing device where the sensing material is subject to distortion (e.g., deflection, stretching, etc.) by an outside force. Such devices may include, but are not limited to, pressure sensors, strain sensors, shear sensors, stress sensors and switches. Because of the superior flexibility of polymer and/or elastomer materials, embodiments of the present invention may be distorted by relatively minute outside forces (e.g., pressures <1 Pa).

Further embodiments may include configuring the conductivity of the nanocomposite and/or configuring the geometric shape of the embedded nanocomposite pattern such that the change in conductivity/resistance of the nanocomposite in response to the distortion is maximized according to the expected distortion of the sensing material (e.g., deflection for a pressure sensor, stretching for a strain sensor, etc.). Accordingly, embodiments of the present invention may be configured to exhibit a sufficiently high sensitivity as to detect such minute distortions. For example, as previously discussed, the geometric configurations of nanotubes and nanowires may be particularly susceptible to distortion, therefore a conductive network of such nanofillers may be more greatly affected (e.g., exhibit a higher, and thus more detectable, change in resistance) by minute distortions than a conductive network employing other nanofillers. Thus, an elastomer nanocomposite including conductive nanotubes and/or nanowires may not only be highly flexible, but also may be configured to exhibit a detectible response, such as a change in resistance, to relatively minute outside forces (e.g., pressures <1 Pa).

Further, the sensitivity of certain embodiments of the present invention may be further enhanced by the configuration of the pattern of the embedded nanocomposite. Depending on the expected external force for a given sensing material (e.g., a perpendicular force for a diaphragm-based pressure sensor, a planar force for a stress, strain or tensile sensor, etc.), the continuous pattern may be configured as to maximize the effect of the external force on the nanocomposite and the resulting change to its conductivity (e.g. change in resistance), thereby resulting in a more sensitive device. For example, certain embodiments of the present invention may incorporate nanocomposites embedded in a continuous pattern whereby the surface area of the continuous pattern exposed to the external force is maximized.

FIG. 1a illustrates a sensing material 100 according to an exemplary embodiment of the present invention. A conductive nanocomposite 110 is embedded on a polymer base 105 in a linear pattern. Nanocomposite 110 includes a plurality of conductive nanofillers 115 distributed in a polymer matrix. Nanofillers 115 may be at least one of nanotubes, nanowires, particles and flakes and may be comprised of any conductive materials. At rest, nanocomposite 110 has resistance $R_0$. In FIG. 1b, a force 120 is applied to sensing material 100. In response to force 120, the conductive nanofillers 115 are separated apart, leading to a loss of contact points and widening of intertubular distances and therefore impeding the electron transfer ability of the conductive network of conductive nanofillers 115. The resistance 125 of nanocomposite 110 is thereby increased by a factor ΔR such that nanocomposite now exhibits a resistance of $R_0+\Delta R$ 130.

While the pattern of embedded nanocomposite 110 is a straight line, other embodiments of the present invention may employ different traceable patterns. FIGS. 2a to 2h illustrate alternative embodiments of the present invention wherein a patterned nanocomposite 205 is embedded in polymer base 200. The nanocomposite patterns 205 displayed in FIG. 2 are by no means an exhaustive list of potential patterns.

Figure 3B:
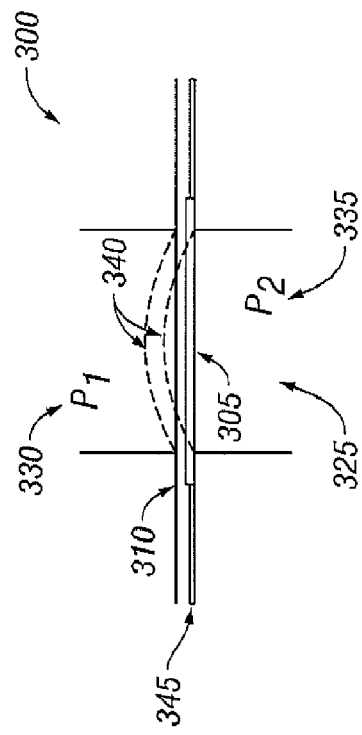
FIGS. 3a and 3b isometric and side views, respectively, of a pressure sensor according to an exemplary embodiment of the present invention.
Figure 3A:
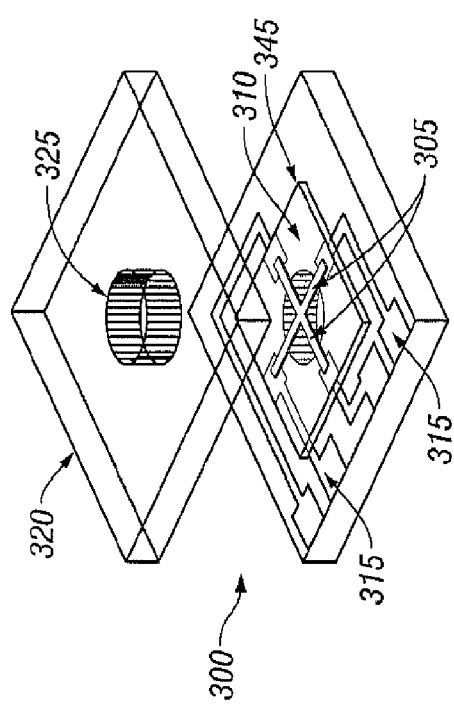

FIGS. 3a and 3b illustrate a diaphragm-based pressure sensor 300 according to an exemplary embodiment of the present invention. Patterned nanocomposites 305 are embedded in polymer base 310 to form diaphragm 345. An electrical terminal 315 makes contact with each end of nanocomposite 305. Diaphragm 345 is situated inside of assembly 320 having through-hole 325 and oriented such that all or a portion of nanocomposite patterns 305 are within the circumference of through-hole 325. Two pressures $P_1$ 330 and $P_2$ 335 are present in through-hole 325, one each on opposite sides of diaphragm 350. When P1=P2, diaphragm 345 is at rest. When P1 is not equal to P2, diaphragm 345 deflects in the direction of lower pressure. For example, in FIG. 3b, when P1 is less than P2, diaphragm 345 is deflected to a deflection point 340 in proportion to the difference between P2 and P1. Voltage, current, and resistance measurements may be taken across any nanocomposite pattern 305 across corresponding electrical terminals 315 making contact with either end of the nanocomposite 305. Certain embodiments of the present invention may be configured to detect pressure changes with a sensitivity on the order of 1 Pa. In order to convert a resistance measurement into a corresponding pressure, embodiments of the present invention may employ a variety of computation techniques including, but not limited to, defining pressure change as a function of resistance, change of resistance, or percentage change in resistance. In certain embodiments of the present invention, a highly flexible elastomer, such as PDMS, may be used for polymer base 310 and/or as the polymer matrix of nanocomposite 305. The superior flexibility of such materials allows for deflection of diaphragm 345 at minute pressure differentials between P1 and P2. In certain embodiments, a pressure differential as low as 1 Pa between P1 and P2 may result in a detectable deflection 340 of diaphragm 345. Thus, certain embodiments of the present invention may be configured such that nanocomposite pattern 305 exhibit a detectable change of resistance across electrical terminals 315 when the differential pressure between P1 and P1 is as low as 1 Pa. Such sensitivity is not possible in sensing devices using other materials, such as silicon.

Figure 4:
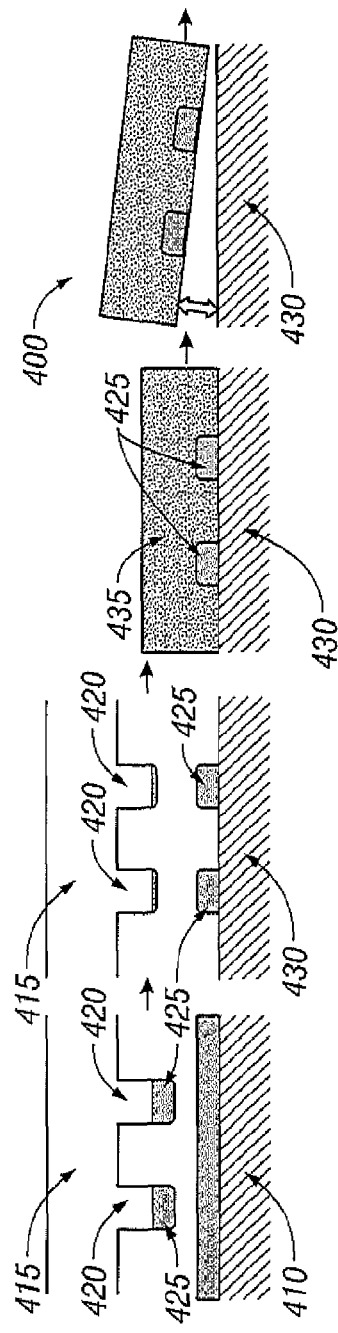
FIG. 4 is a front view illustrating steps in a method for manufacturing a sensing material having an embedded pattern of conductive nanocomposite according to an exemplary embodiment of the present invention.

FIG. 4 illustrates steps of a method for manufacturing a sensing material 400 for a sensor according to an exemplary embodiment of the present invention. Nanocomposite 405 is deposited atop substrate 410. In certain embodiments, nanocomposite 405 may be applied to substrate 410 by spin coating. Stamp 415 is provided having a raised pattern 420. Stamp 415 may be dipped into nanocomposite 405 and removed such that the desired nanocomposite pattern 425 adheres to the raised pattern 420 on stamp 415. Stamp 415 may then be applied to a second substrate 430, which may have been pretreated with a chemical release agent such that the agent facilitates the debonding of nanocomposite 425 from stamp 415 and imprinting it onto the second substrate 430. Next, after partially curing nanocomposite pattern 425, mixture 435, comprising a polymer and a polymer curing agent, may be poured over the nanocomposite pattern 425 such that pattern 425 is submerged. After mixture 435 has cured, sensing material 400 may be removed from substrate 430. In certain embodiments of the present invention, stamp 415 may be used repeatedly to transfer nanocomposite patterns to desired substrates/polymer bases, thereby enhancing the efficiency and reliability of pattern generation, even in the fabrication of multiple devices.

According to certain embodiments of the present invention, nanocomposite 405 may be created by dissolving a polymer in a first organic solvent solution and dispersing a nanofiller, such as CNTs or nanowires, into a second organic solvent solution. In some embodiments, the polymer is added to the first organic solvent solution at a ratio of about 1:4, and the nanofiller is added to the second organic solvent solution at a ratio of about 1:20. Any appropriate agitation, such as stirring, may be employed to disperse the nanofiller in the second organic solvent solution. In certain embodiments, this dispersion may be achieved by magnetic stirring. Next, the first and second organic solvent solutions may be mixed and stirred to distribute the nanofiller throughout the dissolved polymer. After dissolving the organic solvent from the mixture, a polymer curing agent may be added to yield a conductive nanocomposite 405. In some embodiments, the organic solvent solutions used are selected from one of toluene, chloroform, tetrahydrofuran (THF), dimethylformamide (DMF) and dichloromethane (DCM).

Figure 5:
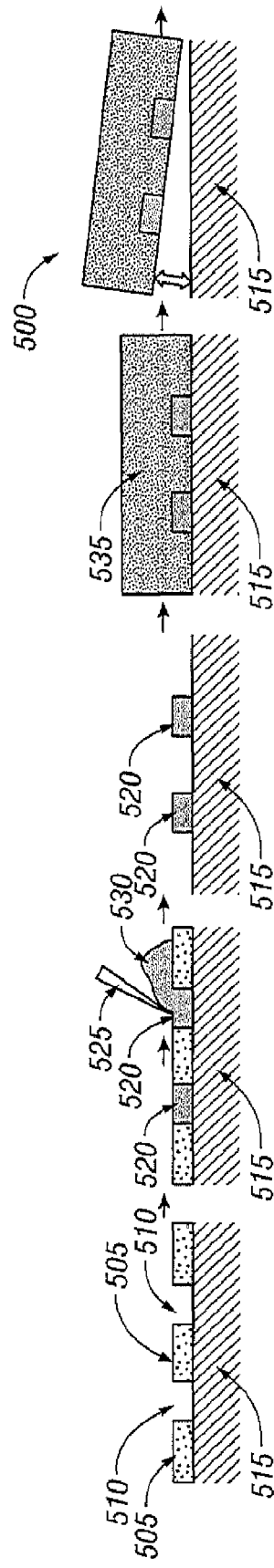
FIG. 5 is a front view illustrating steps in a method for manufacturing a sensing material having an embedded pattern of conductive nanocomposite according to an exemplary embodiment of the present invention.

FIG. 5 illustrates steps for an alternative method for manufacturing a sensing material 500 for a sensor according to an exemplary embodiment of the present invention. Screen 505, having grooves 510 that define the desired pattern for the nanocomposite, is placed on top of substrate 515. In some embodiments, screen 505 is a tape screen, but other suitable screens may be used. In other embodiments, grooves 510 were created after the screen was placed on top of substrate 515 by laser ablation. Next, a nanocomposite 530 may be poured over screen 505 such that the nanocomposite fills grooves 510 to form the desired nanocomposite pattern 520. Excess nanocomposite 530 may be removed with and edged tool 525. After the nanocomposite pattern 520 has partially cured, mixture 535, comprising a polymer and a polymer curing agent, may be poured over the nanocomposite pattern 520 such that pattern 520 is submerged. After mixture 535 has cured, sensing material 500 may be removed from substrate 515. In certain embodiments of the present invention, nanocomposite 530 may be fabricated as set forth above regarding nanocomposite 405 from FIG. 4. The alternative method as illustrated in FIG. 5 may further increase the efficiency of fabrication of embodiments of the present invention, as multiple desired patterns for the embedded nanocomposite may be implemented without the need for creating multiple corresponding stamps.

Example 1

This example details a strain sensor and a method for fabricating said sensor according to exemplary embodiments of the present invention. MWCNTs were mixed with PDMS to form conformal nanocomposites. This was facilitated by toluene, a strong organic solvent, as it dissolved PDMS base polymer easily and allowed monodispersion of MWCNTs. Accordingly, PDMS base polymer was added into toluene at a 1:4 volume ratio. Dry MWCNTs (having an outer diameter of 20 to 40 nm) were separately dispersed in another toluene solution at a 1:20 weight ratio and magnetically stirred for 2 hours before the two solutions were mixed together in an open container. While further magnetic stirring helped the mixing of PDMS and MWCNTs, volatile toluene slowly evaporated on a hot plate (50° C.) under a chemical hood. After the toluene reached full evaporation, a PDMS curing agent (1:10 weight ratio to base polymer) was added into the mixture.

For the purpose of prototyping, a stamp with a raised pattern of a single straight line was utilized. In certain embodiments, the stamp may be glass, plastic, elastomeric, or other suitable material. First, the stamp was held on the vertical beam of a wafer prober. Meanwhile, the prepared PDMS-MWCNT composite "ink" was spin-coated into a thin layer (~60 μm) onto a silicon wafer which was placed underneath the stamp. Next, the stamp was dipped into the ink and lifted up again after a few seconds. Then the nanocomposite adhering to the raised pattern of the glass stamp was transferred via stamping onto a slide glass substrate which had been previously treated with chlorotrimethylsilane—a chemical release agent to facilitate the debonding of PDMS from glass. Subsequently, the imprinted conductive composite pattern was partially cured in an oven at 60° C. for 30 minutes to solidify the pattern. Additional bulk PDMS mixed with base polymer and curing agent was then poured atop to submerge the imprinted pattern. In the final step, the PDMS block was degassed in a vacuum pump and fully cured at 60° C. for 4 hours before being debonded from the glass substrate. Eventually, an all elastomer sensing material having a PDMS-MWCNT nanocomposite patterned in a straight line and embedded into a bulk PDMS base was fabricated.

FIGS. 1a and 1b illustrate a sensing material 100 that may be used as a strain sensor as set forth above in Example 1. Nanocomposite 110, (PDMS-MWCNT for the purposes of Example 1) is embedded in polymer base 105 (PDMS for the purposes of Example 1). Composite 110 is patterned in a straight line. Under tensile strain, as illustrated in FIG. 1b, the geometry and spacing of CNTs 115 (MWCNTs for the purposes of Example 1) are altered, causing in a change in the resistance across nanocomposite 110.

For the purposes of this example, the PDMS block with embedded strain sensor was manually stretched and relaxed for multiple cycles while the change in the resistance across the PDMS-MWCNT nanocomposite was recorded with a digital multimeter. To ensure consistency of testing result and prevent possible buckling of the device, tensile strain remained at zero or positive through experimentation.

Figure 6:
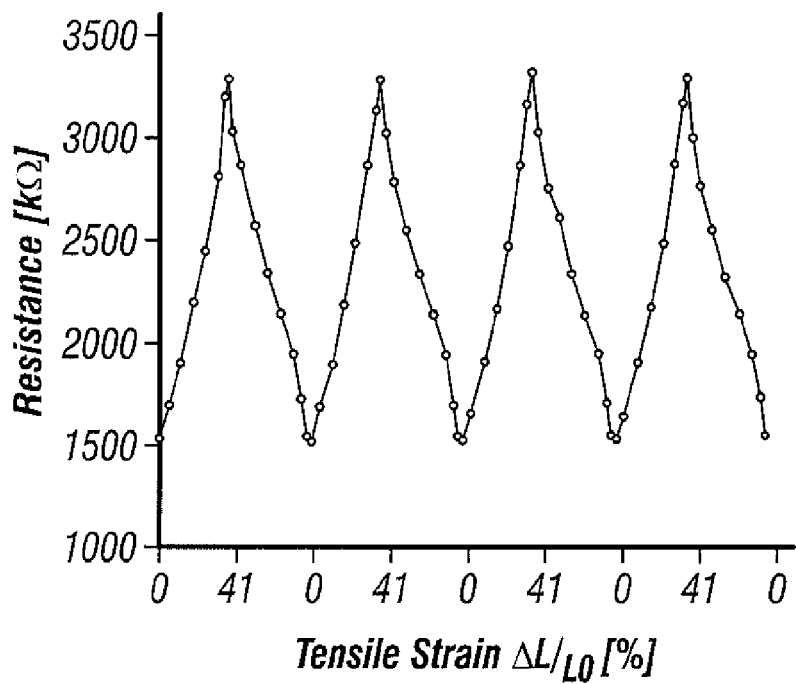
FIG. 6 is a plot of resistance versus tensile strain of a strain sensor according to an exemplary embodiment of the present invention.

Under different levels of tensile strain, the sensor revealed significant change in its resistance. Maximum tensile strain of over 40% was applied to the device during tests resulting in a sensor resistance between 1.54 MΩ and 3.31 MΩ, as illustrated in the plot displayed in FIG. 6. The ability of the PDMS nanocomposite strain sensor to repeatedly endure large mechanical deformations may serve as an advantage over strain sensors made from other materials. Additionally, as demonstrated in FIG. 6, the strain sensor showed consistency in its resistance change over multiple cycles of measurements—a desirable attribute for sensing applications. Finally, the gauge factor for the strain sensor fabricated in this Example was calculated to be about 2.7.

Example 2

Nanocomposite containing about 9% wt MWCNTs was prepared, as this concentration yielded relatively high conductivity and was not too viscous to manipulate. As an alternative to the stamping method set forth in Example 1, a tape screen was positioned on top of a substrate. Next, the tape screen was exposed to a programmable focused laser beam to define the desired pattern(s) for the nanocomposite. The conductive nanocomposite was manually filled into the laser defined grooves, and any excessive amount was removed with a razor blade. Afterward, the tape screen was peeled off, leaving behind a thin layer of nanocomposite patterns on the substrate. The curing of the nanocomposite pattern(s), addition and curing of the bulk PDMS block, and debonding from the substrate were performed as set forth in Example 1.

Figure 7A:
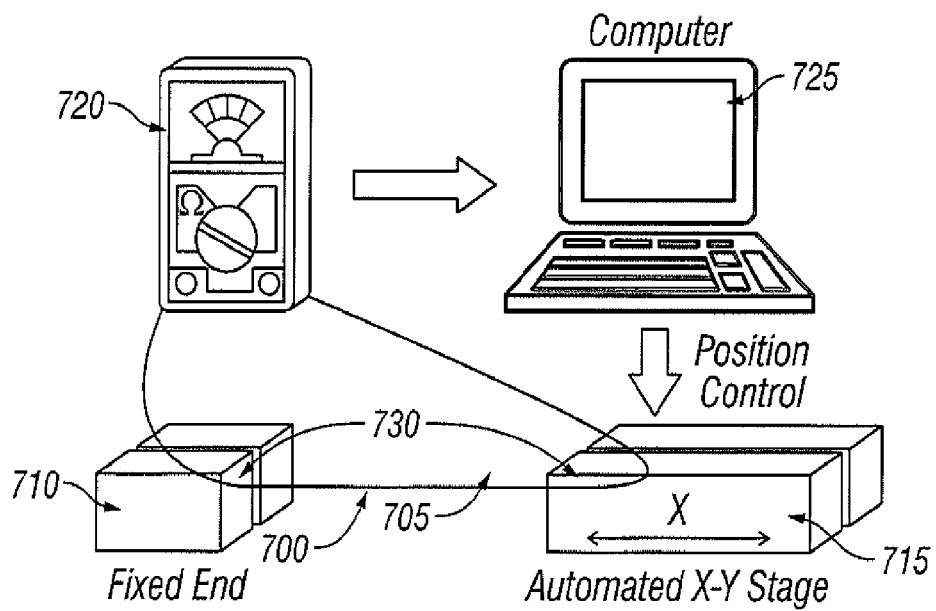
FIG. 7a is a diagram for an experimental setup for a strain sensor according to an exemplary embodiment of the present invention.

In the experimental setup for strain testing as illustrated in FIG. 7a, sensing material 700 containing the patterned conductive PDMS-MWCNT nanocomposite 705 was firmly fasted by two metal grips—one end fixed to a static position 710, and the other to an automated motion stage 715. The position of motion stage 715 was numerically controlled by computer 725, therefore, the displacement and strain of samples could be known at any given time. Two probe electrode connections 730 were made at both ends using copper/gold wires or cutout aluminum films. As samples were stretched and relaxed on the motion stage 715, the resistance across nanocomposite 805 was measured in real time with digital multimeter 720 having an RS-232 PC interface with computer 725. To ensure the consistency of testing and prevent buckling of sensing material 700, the applied tensile strain was kept at zero or positive throughout the experiments.

Figure 7B:
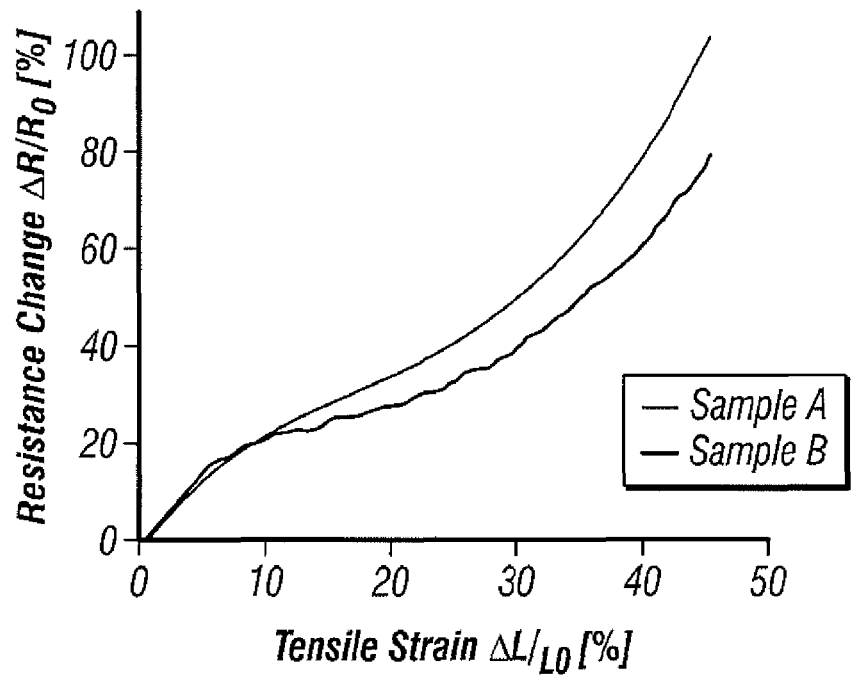
FIG. 7b is a plot of change in resistance versus percentage of tensile strain for a strain sensor according to an exemplary embodiment of the present invention.

To prove the concept of using nanocomposites for strain detection, a linearly increasing tensile strain was applied onto samples while resistance was simultaneously recorded. For the purposes of this demonstration, the simplest pattern of a single line along the strain axis was selected for the nanocomposite pattern, and representative responses for two such patterns (Sample A and Sample B) are plotted in FIG. 7b. In this case, the two single-line patterns shared similar dimensions, both 44 mm long and around 50 μm thick. Relatively large widths (sample A~600 μm and B~9 μm) were used to fit the measuring range of the ohmmeter (max 44 MΩ). When samples A and B were elongated to as high as 45% of tensile strain, their relative resistance increased by 78% and 103%, respectively, as shown in FIG. 7b. Other tests of nanocomposite with different dimensions (thickness and width) also revealed similar resistive responses. Any variation of response across devices according to exemplary embodiments of the present invention may be attributed to the dispersion quality of CNTs. Overall, although the resistive response were not perfectly linear with the tensile strain, the overall sensing factor, defined by the ratio of $\Delta R/R_0$ and strain $\epsilon$ was found to be around 2.

Figure 7C:
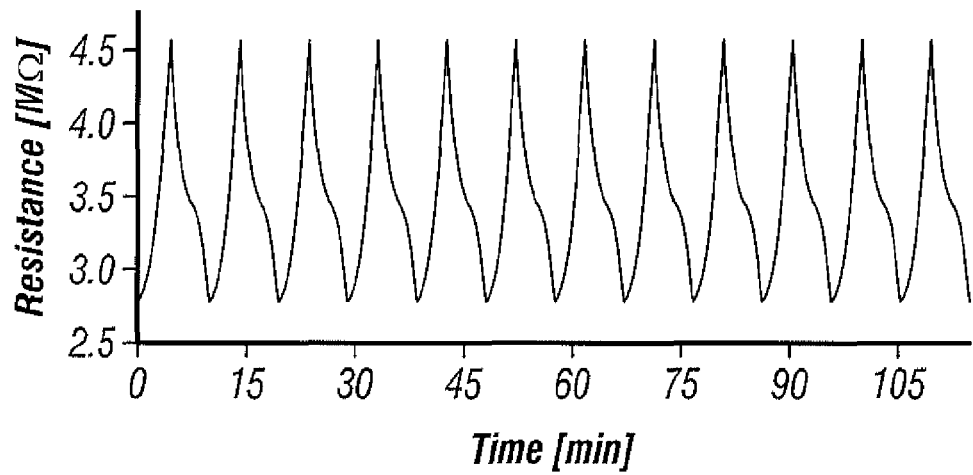
FIG. 7c is a plot of resistance versus time on a strain sensor according to an exemplary embodiment of the present invention.

Multiple cycles of stretch and relaxing sensing material 700 were carried out on the automated motion stage at a constant strain rate (4 mm/min). Although some initial time dependence of resistance was observed, the resistive response was found to be very consistent when the system reached an equilibrium, as seen in FIG. 7c. Repeatable resistance change occurred over tens of cycle.

The ability of polymer based composites, particularly PDMS-based composites, to endure repeated large deformations without any mechanical failure presents a potential advantage over other materials currently used in sensing devices. Accordingly, embodiments of the present invention may be employed in a wide variety of applications. For example, certain embodiments may provide a diaphragm-based pressure sensor with a sensitivity on the order of 1 Pa. Such diaphragm-based pressure sensors may be employed to detect and/or measure changes in air pressure, water pressure (where the water is applied to the top of a diaphragm), or any other gas or liquid. Other embodiments may be configured as pressure or level detectors in water or chemical tanks, as tank or channel leak detectors, or as flow rates sensors in fluidic systems. Further, methods for fabricating patterned nanocomposite polymer sensing materials may employ MEMS technologies to miniaturize such devices when significantly small scales are desirable. Array configurations of certain embodiments of the present invention may be employed to further enhance sensitivity and performance.

Due to the inert and biocompatible nature of polymer materials such as PDMS, embodiments of the present invention may be utilized in a variety of biomedical applications that require in vivo implantation of sensing devices. For example, a long term arterial cuff may integrate a MEMS pressure sensor according to an embodiment of the present invention. Other biomedical applications may include blood pressure monitoring, pulse and breath detection, and pressure monitoring of healing bones and tissues. Implantable implementations of such embodiments of the present invention may further incorporate a wireless communication device configured to transmit measurements to an external point.

Still other embodiments may be configured for use in home security systems, such as for door and window opening/closing detection, window leak detection, tactile sensors, and in other situations where high sensitivity in harsh environments is desired, such as in aerospace, weather and marine devices.

While the embodiments are described herein with reference to various implementations and exploitations, it will be understood that these embodiments are illustrative and that the scope of the invention(s) is not limited to them. In general, embodiments of a patterned nanocomposite polymer sensor as described herein may be implemented using methods, facilities, and devices consistent with any appropriate structural or mechanical system(s). Many variations, modifications, additions, and improvements are possible.

For example, plural instances may be provided for components, operations or structures described herein as a single instance. Boundaries between various components, operations and functionality are depicted somewhat arbitrarily, and particular operations are illustrated within the context of specific illustrative configurations. Other allocations of functionality will also fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A sensing material for a sensor, comprising:
   a polymer base; and
   a nanocomposite embedded into the polymer base in a continuous pattern, wherein the nanocomposite includes a polymer matrix and a plurality of at least one of conductive nanotubes, conductive nanowires, conductive particles and conductive flakes suspended in the polymer matrix;
   wherein the density of the plurality of the at least one of nanotubes, nanowires, particles and flakes is such that the nanocomposite is conductive.

2. The sensing material of claim 1, wherein the continuous pattern is one of a line, a curve or combination thereof.

3. The sensing material of claim 1, wherein the polymer base is an elastomeric polymer.

4. The sensing material of claim 1, wherein the polymer base includes at least one of polydimethylsiloxane (PDMS), silicone elastomer, vinyl acetate, ethylene propylene rubber, polyimide, polytetrafluoroethylene (PTFE), poly(p-xylylene) polymer, fluorocarbon-based polymer, and poly(methyl methacrylate) (PMMA).

5. The sensing material of claim 1, wherein the polymer matrix is an elastomeric polymer.

6. The sensing material of claim 1, wherein the polymer matrix comprises at least one of polydimethylsiloxane (PDMS), silicone elastomer, vinyl acetate, ethylene propylene rubber, polyimide, polytetrafluoroethylene (PTFE), poly (p-xylylene) polymer, fluorocarbon-based polymer, and poly (methyl methacrylate) (PMMA).

7. The sensing material of claim 1, wherein the plurality of the at least one of nanotubes, nanowires, particles and flakes is uniformly distributed in the polymer matrix.

8. The sensing material of claim 1, wherein the nanocomposite is configured such that malformation of the polymer base yields a corresponding change to the resistance of the nanocomposite.

* * * * *